Dec. 30, 1969  G. E. PORTER  3,487,357
BACKUP SIGNAL FOR A VEHICLE
Filed Dec. 15, 1967

INVENTOR.
GILBERT E. PORTER
BY Warren N. F. Schmieding
ATTORNEY

United States Patent Office 3,487,357
Patented Dec. 30, 1969

3,487,357
BACKUP SIGNAL FOR A VEHICLE
Gilbert E. Porter, Escondido, Calif., assignor of forty percent to William R. Tattersfield, and thirty percent to Hermine S. Reid and William B. Reid, all of Escondido, Calif.
Filed Dec. 15, 1967, Ser. No. 690,852
Int. Cl. B60q *1/00, 1/26;* H01h *3/16*
U.S. Cl. 340—59                                 4 Claims

ABSTRACT OF THE DISCLOSURE

A system for warning movement of a vehicle rearwardly, which comprises an element that is sensitive to and movable in response to flow of lubricant and which when moved in one direction causes a signal to be effective. The element is disposed adjacent one of the ring gears of the differential of the vehicle and response to movement of the lubricant when the ring gear is rotating one of the wheels of the vehicle for moving the vehicle rearwardly.

BACKGROUND OF THE INVENTION

Field of the invention

The invention is directed to a warning signal such as a lamp or horn for indicating that a vehicle is moving rearward.

Description of the prior art

The Hadley Patent No. 2,431,117 is directed to energizing an electrically controlled signal by closing a circuit to the signal through the gear shift lever. The Hadley Patent No. 2,427,453 employs an overrunning clutch which when the vehicle is moving forwardly is in an inoperative position to actuate a signal switch, but when the vehicle moves rearwardly, the clutch effects closing of a signal switch.

The Brett Patent No. 2,829,213 and Kelley Patent No. 2,711,525 employ electric signal switches, which are actuated mechanically by shifting gearing in the transmission housing.

In each of these structures, material and expensive modifications must be made to the standard factory built mechanisms, resulting in costly installations of back-up signals.

SUMMARY OF THE INVENTION

In practicing the present invention, a unit is attached to standard factory mechanism, which unit employs a standard micro switch and a vane for actuating the switch. The vane is responsive to movement of lubricant in the differential of the vehicle, and it renders the signal switch effective for energizing a signal when a gear in the differential moves to drive the vehicle rearwardly.

Other features and the advantages of the present invention will be apparent from the following description, reference being had to the accompanying drawing wherein a preferred embodiment of the invention is illustrated.

DESCRIPTION OF THE PREFERRED EMBODIMENT

Figure 1:
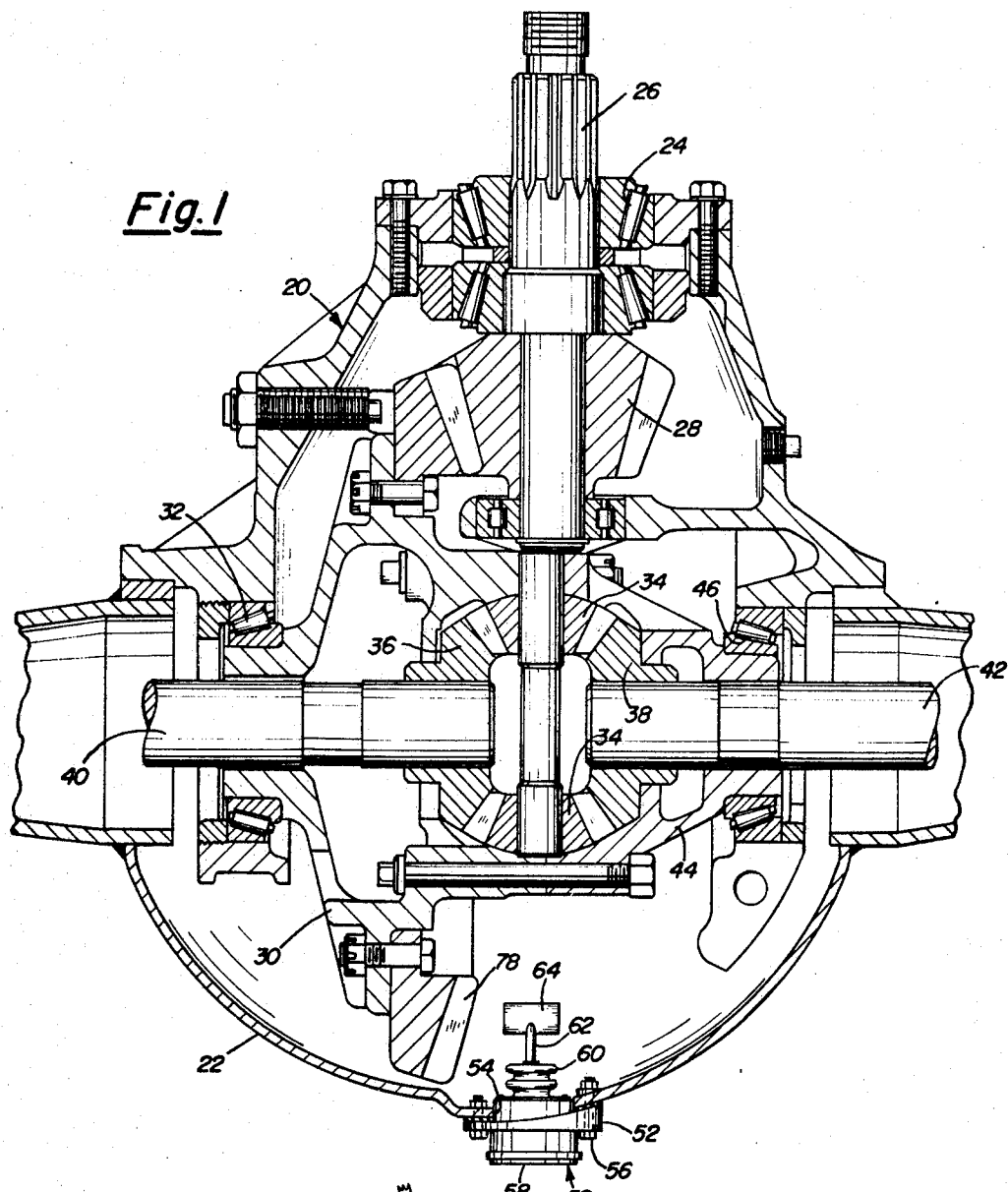
FIG. 1 is a view of a standard type differential, showing the invention applied thereto, the housing being shown in section.
Figure 2:
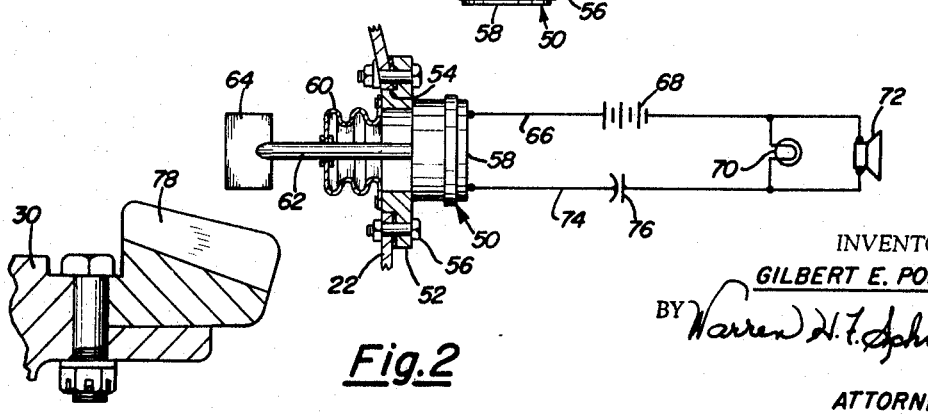
FIG. 2 is a view of the control unit which is attached to the differential housing, part thereof being shown in section, the view also showing the circuit being controlled and also showing in section a gear of the differential, which gear effects movement of the vane of the unit.

Referring more in detail to the drawing, a standard type differential 20, such as model R-170 manufactured and sold by Rochweel-Standard Corporation, of Detroit 32, Mich., is employed. It includes a housing 22 which supports a roller bearing 24 for a shaft 26. This shaft is suitably connected with a drive shaft (not shown) connected with standard transmission mechanism. A bevel gear 28 is driven by the shaft 26 and it rotates a ring gear 30. The ring gear is journaled in a roller bearing 32 and rotates a pair of bevel gears 34, and these gears 34 rotate bevel gears 36 and 38.

Axles 40 and 42 are fixed to gears 36 and 38, respectively, for rotating the rear wheels of the vehicle (not shown). Axle 40 is journaled in the ring gear 30 and axle 42 is journaled in an attachment 44 to the ring gear and that attachment is journaled in roller bearing 46. The housing contains lubricant for the gears and bearings. Upon rotation of shaft 26 in one direction, the ring gear 30 will rotate in one direction to cause the gears in the housing to move the vehicle forwardly, and upon rotation of shaft 26 in the opposite direction, the ring gear will rotate in the opposite direction to cause the gears to move the vehicle rearwardly.

The signal unit 50 includes a fixture 52, which extends through an opening 54 in the housing 22. It is held in place by screws 56. Fixture 52 carries a micro switch 58 on the exterior of the housing and carries a flexible wall in the form of a bellows 60 which extends into the housing. A rod 62 is fixed to the bellows. One end of the rod actuates the switch and the other end carries a vane 64. Movement of the vane in one direction causes the rod to close the switch, and, movement of the vane in the opposite direction causes the rod to open the switch. When the switch is closed, an electrical circuit is established including wire 66, battery 68, lamp 70 and/or horn 72, and wire 74. If desirable, the circuit can include a capacitor 76 for providing intermittent signaling.

The vane 64 is disposed adjacent the teeth 78 of the ring gear 30 and is therefore responsive to the movement of the lubricant flow, which flow is generated by the rotation of the ring gear. Thus, it is readily apparent that when the ring gear rotates in one direction, the vane will function to close the switch 58, and, when the ring gear rotates in the opposite direction, the vane will function to open the switch. The unit 50 is positioned with respect to the ring gear 30 so that when the ring gear functions to cause rearward movement of the vehicle, the switch is closed, and, when the ring gear functions to cause forward movement of the vehicle, the switch is open.

In certain installations, it is necessary to drill the opening 54, and in some installations, the vane can extend through the drain opening for the housing, in which event, the fixture will be threaded and function as the plug for the drain opening.

Thus, it is readily apparent from the foregoing that there has been provided a simple, inexpensive, reliable and easily installed back-up signal for vehicles.

I claim:
1. In a vehicle of the type having a differential including a housing containing gears for driving the vehicle either forwardly or rearwardly and containing lubricant for the gears, and in which one of the gears causes movement of the lubricant in one direction when driving the vehicle forwardly and in a different direction when driving vehicle rearwardly, a system for warning rearward movement of the vehicle, which system comprises said one gear and the lubricant and includes:
(A) a signal;
(B) means movable in response to the movement of the lubricant in said different direction for rending the signal effective, said means being ineffective for maintaining the signal effective upon termination of the flow of lubricant in said one direction.

2. A system as defined in claim 1, characterized in that the means is movable in two directions, one for rendering the signal effective and the other for rendering the signal ineffective.

3. A system as defined in claim 1, characterized in that the signal is electrically operated and the means is an electric switch, and further characterized to include:
(C) an element responsive to the flow of lubricant and disposed adjacent said one gear for actuating the switch.

4. A system as defined in claim 3, characterized in that the means is movable in two directions, one for rendering the signal effective and the other for rendering the signal ineffective.

References Cited

UNITED STATES PATENTS

| | | | |
|---|---|---|---|
| 1,677,008 | 7/1928 | Townsend | 200—61.39 |
| 1,926,105 | 9/1933 | Ludwig. | |
| 2,484,664 | 10/1949 | Ziers | 340—271 X |
| 3,270,317 | 8/1966 | Edelblut | 340—71 |

JOHN W. CALDWELL, Primary Examiner

K. N. LEIMER, Assistant Examiner

U.S. Cl. X.R.

200—61.39; 340—70, 271